Oct. 8, 1957
C. J. DE GRAVE, JR
2,808,761
COMPARISON MAGNIFIER
Filed Nov. 30, 1954
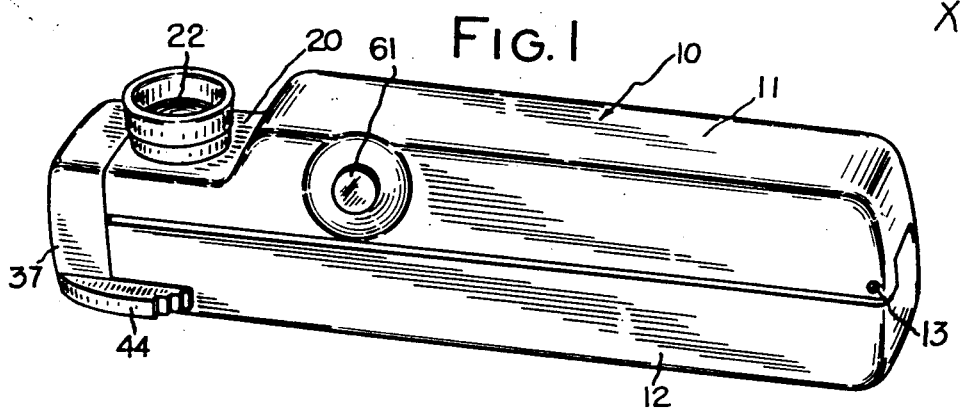
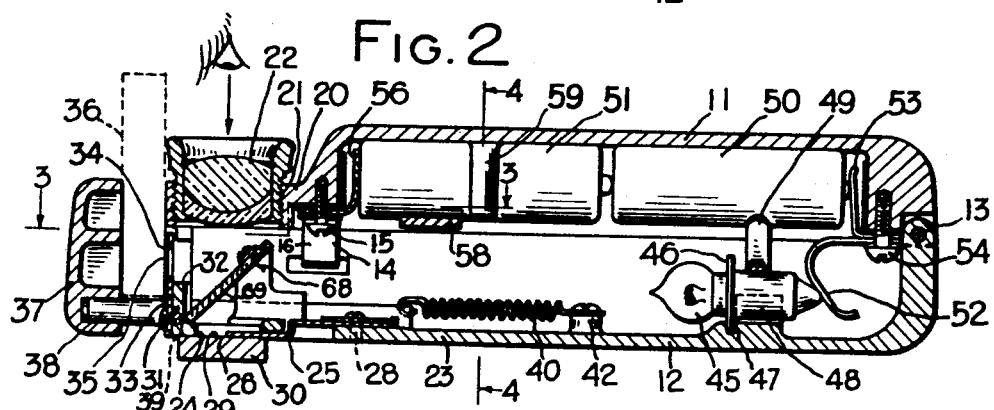
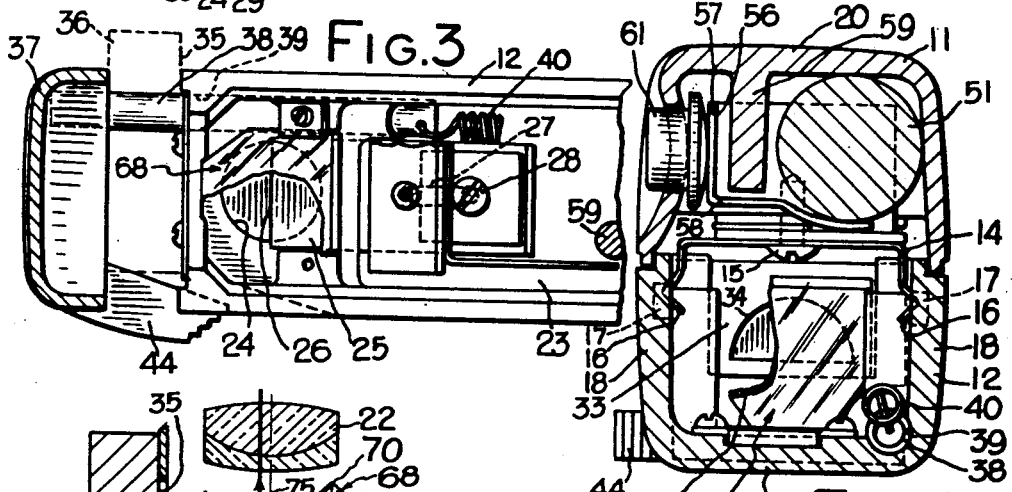
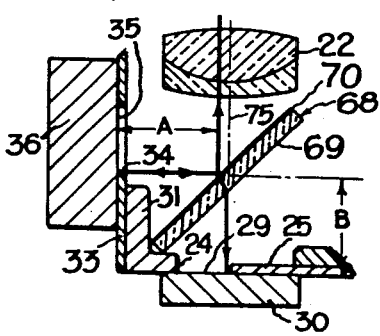
INVENTOR.
CHARLES J. DeGRAVE Jr.
BY
*J. A. Ellestad*
*W. E. Recktenwald*
ATTORNEYS United States Patent Office 2,808,761
Patented Oct. 8, 1957

2,808,761

COMPARISON MAGNIFIER

Charles J. De Grave, Jr., Chili, N. Y., assignor to Bausch & Lomb Optical Company, Rochester, N. Y., a corporation of New York Application November 30, 1954, Serial No. 472,007

1 Claim. (Cl. 88—39)

This invention relates to optical inspection instruments and more particularly to a surface comparison magnifier.

Some current comparison magnifiers have heretofore been so constructed that costly microscope type viewing means are required to view the images of the surfaces being compared. The microscope type viewing means makes the instrument needlessly bulky and, since a microscope is a delicate instrument, it easily gets out of adjustment in normal factory use. Other current comparison magnifiers may overcome the aforementioned disadvantages but in so doing an instrument is built that is either clumsy or expensive or suffers from some other objectionable defect.

It is therefore a principal object of this invention to overcome the above-noted disadvantages of the prior art and provide an improved comparison magnifier.

It is another object of this invention to provide an improved comparison magnifier of simple construction, which may not only be economically manufactured, but which also will be efficient in use, easily operated, and unlikely to get out of repair.

It is still another object of this invention to provide an improved comparison magnifier of compact construction which may be conveniently handled when in use and which may be easily carried or stored when not in use.

These and other objects and advantages reside in certain novel features of construction, arrangement and combination of parts as will hereinafter be more fully described and pointed out in the appended claim.

Referring to the drawings:

Fig. 1 shows a perspective view of my improved comparison magnifier.

Fig. 2 is a longitudinal sectional view taken through the center of Fig. 1.

Fig. 3 is a sectional view taken on the line 3—3 of Fig. 2.

Fig. 4 is a sectional view taken on the line 4—4 of Fig. 2.

Fig. 5 is an enlarged fragmentary view showing the relationship of certain parts.

A preferred embodiment of my invention is shown in the drawings wherein 10 indicates an elongated housing made of any suitable material, such as aluminum, plastic or the like, and having an upper part 11 and a lower part 12 hinged together at the rear portions by a pin 13. A resilient member 14, fastened by a screw 15 to the inner side of the upper part 11, has opposite end portions 16 shaped to engage in the recesses 17 formed in the inner side walls 18 of the lower part 12 whereby the upper part 11 and lower part 12 may be held together.

The upper part 11 of the housing has a top side 20 through which an aperture 21 is formed in the front portion thereof for receiving in threaded relation a magnifying lens means 22 which has, in this embodiment, a circular field of view. The lower part 12 of the housing 10 has a bottom side 23 through which a circular aperture 24 is formed in optical alignment with, and substantially along the optical axis of, the magnifying lens means 22 in the top side 11. Slidably mounted adjacent the aperture 24 in the bottom side 23 is a masking member 25 which has a straight edge 26 formed across the front portion thereof and which also has an elongated slot 27 running lengthwise through the rear portion thereof. A screw 28, having a head on one end, passes through the slot 27 in the masking member 25 and is secured to the bottom side 23 so that said member 25 may be moved forward and backward relative to the aperture 24 for exposing either the whole or only half of the aperture 24. The bottom side 23 of the housing 10 is adapted to be placed upon a surface 29 of an object 30 being examined whereby the image of the surface through either the whole circular aperture 24 or the semi-circular masked off portion thereof is formed by the magnifying lens means 22 in the eye of an observer.

The housing 10 has a front wall 31 with an opening 32 therethrough over which is fastened a mask 33 having a semi-circular aperture 34 therethrough which has a straight diametrical edge across the bottom of the aperture. A standard surface 35 of a test sample or object 36 is held against the front wall 31 of the housing 10 by a holder plate 37 which has fastened on its lower portion a rearwardly projecting rod 38 adapted to slidably engage in a bore 39 formed in the front wall 31. The holder plate 37 is yieldably held against the front wall 31, or the test sample 36, by a spring 40 which is fastened between the inner end of the rod 38 and a lug 42 upwardly projecting from the bottom wall 12. Fastened on the side of the plate 37 and extending rearwardly and outwardly therefrom is an actuating finger 44 which is so positioned with respect to the housing that forward pressure on the finger 44 will slide the plate 37 forwardly with respect to the front wall 31 whereby different test samples 36 may be inserted between the plate 37 and the front wall 31 of the housing for aligning surfaces of the samples or objects 36 with the aperture 34.

Mounted within the rear portion of the lower part 12 of the housing 10, in alignment with the aperture 34 in the mask 33, is a light source 45 which has a shoulder 46 seated in a groove 47 in mount 48. A C-shaped resilient finger 49 is fastened to the mount 48 in such a way that the lower portion of the C will bear against the light source 45 for holding it assembled on the mount. The upper portion of the C-shaped finger 49 will bear against one battery 50 of a pair of batteries 50, 51 carried by the upper part 11. Spring clips 52, 53 are held in engagement, respectively, with the light source 45 and one end of battery 50 by a screw 54 threaded into the upper part 11 of the housing 10. Bearing against the other end of the pair of batteries 50, 51, and secured to the upper part 11 by the screw 15, is a spring clip 56 which has an arm 57 extending into the open space between a contact pin 59 and the inner end of an actuating button 61 whereby pressing the button 61 will flex the arm 57 so that it will contact the pin 59. Attached to the arm 57 along the lower edge thereof is a flat keeper 58 which extends transversely of said edge of the arm into supporting position under the battery 51 for holding the battery in the upper part 11 of the housing.

In the preferred form of my invention the housing is made of a conducting metal whereby the contact pin 59 will be electrically connected to the light source 45 by the metal in the housing so that contact of the arm 57 of clip 56 with the pin 59 will complete the circuit from the batteries 50, 51 to the light source 45 for energizing same. When the housing 10 is made of a plastic or other non-conducting material, any conventional electrical conducting means may be provided for electrically connecting the pin 59 with the light source 45. The upwardly projecting finger 49 will hold the battery 50 in assembled relation in the housing 10 when the lower part 12 and upper part 11 are in closed position.

The upper part 11 may be turned about the pin 13 by disengaging resilient member 14 from the recesses 17 whereby the clip 52 and finger 49, respectively, are disengaged from the light source 45 and from the battery 50. With the housing 10 in open position, the batteries 50, 51 and light source 45 may be replaced.

The aperture 34 in the mask 33 is in alignment with the light source 45 so that the path of light rays intersects the optical axis of the magnifying lens means 22. Mounted in the housing at a forty-five degree angle to the optical axis of the magnifying lens means 22 and in the path of light rays from the light source 45 to the aperture 34 is a light transmitting mirror 68 having a glass base 69 and a semi-transparent reflecting coating 70 on the front surface thereof. The coating 70 is selected from the group of coatings, such as silver, that are well known in the art as having the property of transmitting and reflecting light rays in substantially equal amounts so that the standard surface 35 of an object 36 held at the aperture 34 will receive by transmission through the mirror 68 substantially the same amount of illumination as the surface 29 of the object 30 held in the plane of the aperture 24 will receive by reflection from the mirror 68.

Referring specifically to Fig. 5, it will be noted that the vertical axis 75 lying perpendicular to the plane of the aperture 24 and passing through the center of the circular aperture 24, coincides with the optical axis of the magnifying lens means 22 from the plane of the object to the mirror where the optical axis of the magnifying lens means 22 is displaced from said vertical axis. This displacement is the result of the optical characteristics of the glass plate 69 which, when placed in the optical path of an optical system, refracts the light rays slightly. The optical path from the magnifying lens means to the surface 29 of the object 30 is shortened by the light rays passing through the mirror 68. Therefore, so that the optical path A from the surface 35 of object 36 to the magnifying lens means 22 will be equal to the optical path B from the surface 29 of object 30 to the magnifying lens means, the mirror 68 will be positioned slightly closer to the surface 35 than to the surface 29. The distance B is greater than the distance A by an amount that is dependent upon the thickness and index of refraction of the glass 69.

The magnifying lens means 22 has a circular field of view so that the surface 35 of the object 36 lying in the plane of and aligned with the semi-circular aperture 34 in the mask 33 on the front wall 31 will be imaged in the eye of an observer by the magnifying means 22 after reflection by the mirror 68, with the straight diametrical edge of the aperture substantially dividing the field of view of the magnifying means 22. The aperture 24 in the bottom side 23 may be partially masked off by member 25 whereby the aperture 24 will be semi-circular in shape with the edge 26 of member 25 forming the straight diametrical edge thereof which, when viewed through the magnifying lens means 22, will appear in juxtaposed relation with the straight edge of the aperture 34. The surface 29 of an object 30 held against said aperture 24 will be imaged in the field of view of the magnifying lens means 22 in juxtaposed side by side relationship with the surface 35 of object 36, lying in the plane of and aligned with, the aperture 34 whereby the various characteristics of the surfaces may be compared.

The specific type of standard test surfaces 35 on objects 36 to be used in a series of tests will depend on the type of tests to be made. The tests may be for surface color, quality of surface finish, type of surface finish or any of the other types of surface tests known in the art. The required standard surface 35 is held in the plane of aperture 34 by the holder 37 whereupon the instrument is placed on the object 30 so as to position the unknown surface 29 in the plane of the aperture 24. When the button 61 is depressed, both surfaces 29, 35 are illuminated by the light source 45 so that an observer may sight through the magnifying lens means 22 for viewing the magnified images of the surfaces 29 and 35 in juxtaposed side by side relationship for comparison with each other.

By eliminating the standard test object 36 and by sliding the masking member 25 to unmask the aperture 24, the instrument can be used as a surface inspection instrument. The housing may be placed with the surface to be inspected aligned with the aperture 24 in the bottom side 23 whereby the surface may be illuminated by the light source 45 and may be viewed through the magnifying lens means 22 for examination of the surface in question.

From the foregoing, it will be apparent that I am able to attain the objects of my invention and provide a new and improved surface comparison magnifier which is simple in construction and operation, and efficient in use. The magnifier is conveniently shaped and constructed so as to be easily handled and stored. Various modifications can obviously be made without departing from the spirit of my invention or the scope of the appended claim.

I claim:

A comparison magnifier for simultaneously comparing the surfaces of two objects comprising a housing having a front wall, and top and bottom sides, said wall and sides having apertures therethrough adjacent the front of the housing, a light source mounted in the housing in alignment with the aperture in the front wall, a magnifying lens means mounted in the aperture in the top side in alignment with the aperture in the bottom side, a light transmitting mirror mounted in the housing across the optical axis of the magnifying lens means and in the path of light rays from the source, said mirror being so positioned with respect to the planes of the apertures in the front wall and bottom side that substantially equal amounts of illumination will be provided for the planes of said apertures, each of said two last-named apertures being so positioned with respect to the mirror that they will appear in juxtaposed side by side relationship when viewed through the magnifying lens means, and means for holding the surface of one of the objects over the aperture in the front wall, said means comprising a plate having a finger tab on one side, a rod fastened on said plate and extending rearwardly into an opening in the housing, resilient means attached to the rod and housing for yieldably holding the plate against the front wall of the housing whereby the surface of the object held by the plate over the aperture in the front wall may be compared with the surface of the object held at the aperture in the bottom side.

References Cited in the file of this patent

UNITED STATES PATENTS

| | | |
|---|---|---|
| 2,184,750 | Meinhardt et al. | Dec. 26, 1939 |
| 2,286,430 | Minton et al. | June 16, 1942 |
| 2,488,146 | Steinhaus | Nov. 15, 1949 |
| 2,621,555 | Williams et al. | Dec. 16, 1952 |